United States Patent

Ekman et al.

[11] Patent Number: 4,603,839
[45] Date of Patent: Aug. 5, 1986

[54] DEVICE FOR TRANSPORT OR DISPLACEMENT OF ELONGATED OBJECTS IN PARTICULAR, AS WELL AS A PULLING OR TRACTION WHEEL COMPRISED IN SAID DEVICE

[75] Inventors: Uno Ekman; Leif Hjert, both of Vänersborg, Sweden

[73] Assignee: Igelfors Bruks AB, Finspång, Sweden

[21] Appl. No.: 499,143

[22] Filed: May 27, 1983

[51] Int. Cl.⁴ .................. A01K 73/06; B66D 1/30
[52] U.S. Cl. .................... 254/329; 251/371
[58] Field of Search ........... 254/371, 372, 374, 329; 464/136, 905

[56] References Cited

U.S. PATENT DOCUMENTS

| | | | |
|---|---|---|---|
| 1,928,117 | 9/1933 | Stewart | 254/371 X |
| 2,827,795 | 3/1958 | Caballeros | 474/9 |
| 3,643,921 | 2/1972 | Puretic | 254/371 X |
| 3,730,483 | 5/1973 | Newell | 254/371 |
| 3,965,767 | 6/1976 | Rinio | 254/371 X |
| 4,054,265 | 10/1977 | Magg et al. | 254/371 |
| 4,093,185 | 6/1978 | Newell | 254/295 |
| 4,120,486 | 10/1978 | Mehnert | 254/371 |
| 4,151,980 | 5/1979 | Burton et al. | 254/371 |
| 4,240,612 | 12/1980 | Mehnert | 254/371 X |

FOREIGN PATENT DOCUMENTS

| | | |
|---|---|---|
| 84606 | 8/1983 | European Pat. Off. . |
| 1461757 | 1/1977 | United Kingdom . |
| 1550175 | 8/1979 | United Kingdom ........ 254/371 |
| 2042674 | 9/1980 | United Kingdom . |

Primary Examiner—Stuart S. Levy
Assistant Examiner—Joseph J. Hail, III
Attorney, Agent, or Firm—Cushman, Darby & Cushman

[57] ABSTRACT

An apparatus for transporting or displacing elongated objects in a direction longitudinal to the object comprises a rotatable traction wheel including a first and a second disc. A plurality of arcuately shaped ridges are defined on opposing surfaces of the discs. The ridges extend substantially axially from the center of the discs to the circumferences of the discs. The first and second discs are journalled to a rotatable shaft. The axial and angular positions of one or both of the discs with respect to the shaft may be adjustable. The shaft may include an articulated joint to permit the angle of rotation of the first disc to be displaced from the angle of rotation of the second disc.

16 Claims, 18 Drawing Figures

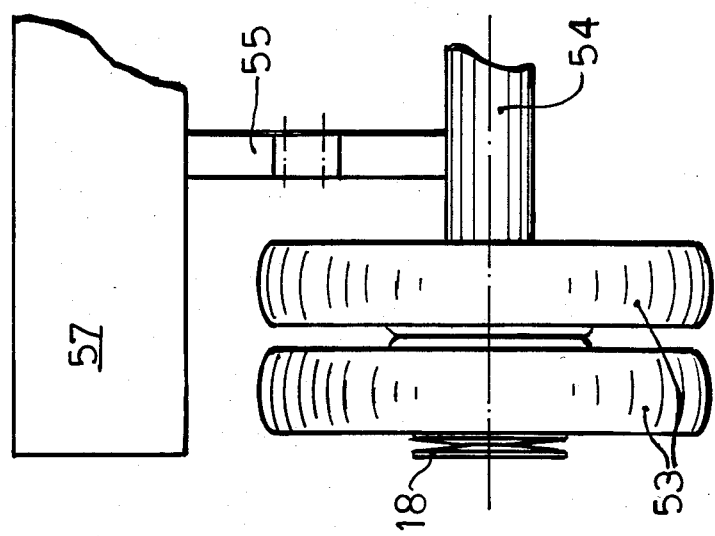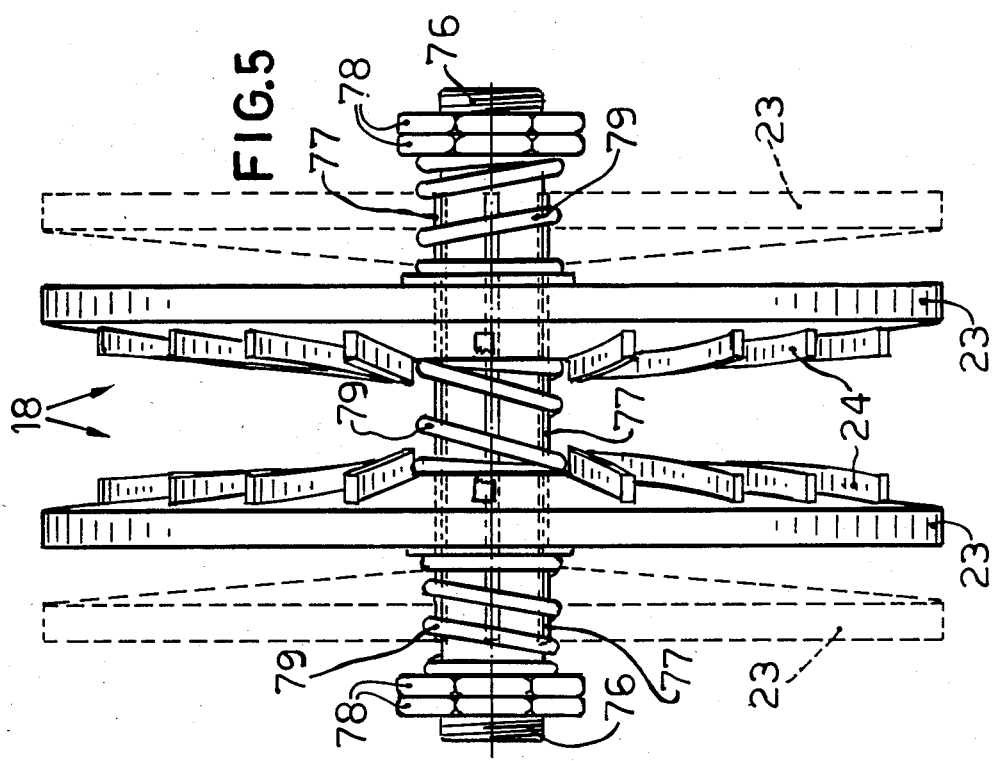

4,603,839

1

DEVICE FOR TRANSPORT OR DISPLACEMENT OF ELONGATED OBJECTS IN PARTICULAR, AS WELL AS A PULLING OR TRACTION WHEEL COMPRISED IN SAID DEVICE

BACKGROUND OF THE INVENTION

This invention relates to a device for transporting or displacing elongated objects with respect to the device itself, and includes embodiments in which the device is stationary and displaces the object as well as cases in which the device itself moves along the object, which in this embodiment usually utilizes a stationary, horizontal or more or less sloping line or wire.

A prior device of a similar kind forms the subject matter of the GB Pat. No. 1 461 757, which relates to winch means having a "capstan" or wire drum and a supplementing drive wheel which comprises two cooperating cam discs. The cams of each disc face the cams of the other disc and are located just opposite to the respective cams of the latter.

Another similar winch means which is disclosed in the U.S. Pat. No. 4,151,980 differs from the above-mentioned one primarily in that each cam of one cam disc is located substantially just opposite an interspace between two cams of the other cam disc. This prior device also comprises a wire drum in combination with the drive wheel.

SUMMARY OF THE INVENTION

The principal object of the invention is to provide a device of this kind which is extensively versatile with respect to its range of utilization and thus can be employed within very different fields and by means of which it is possible to obtain the desired tractional force without any wire drum.

The feeding or transport device according to the invention may thus be utilized in the wood and lumber industry, e.g. for the feeding or advancing of logs in frame saws and so on, and as a winch or transport means.

The feeding or transport device according to the invention may to advantage be utilized also in shipping, to winches on board bigger ships and to the hoisting or hauling of strings, ropes, hawsers, halyards, sheets etc. on board sailing boats and fishing boats as well as to different cranes, traverses and the like in harbours. The device according to the invention may also to advantage be utilized in different lifts and cable-ways, either in a self-propelling container, a bucket, a waggon basket for the transportation of goods or persons or for the driving of a movable rope or wire, to which the goods container or the like is fastened.

Other fields of use for the device is agriculture and erection of electric equipment, where it can be utilized for laying out and taking up electric cables and telephone wires.

As driving means for the present transport or feeding device there is primarily used a combustion engine, e.g. a two-stroke combustion engine, or an electric motor, but the device may also be coupled to another power source, e.g. the power output of a tractor, which comes into account particularly in respect of the wood industry and/or agriculture.

BRIEF DESCRIPTION OF THE DRAWINGS

Further features and advantages of the device according to the invention will become apparent from the following detailed description and the annexed drawings, which diagrammatically and as non-limiting examples illustrate a number of embodiments of the invention.

FIG. 5 is an end view of a traction wheel having axially movable cam discs.

FIG. 8 is a rear view of the traction wheel according to FIG. 7.

DESCRIPTION OF THE PREFERRED EMBODIMENTS

Figure 2:
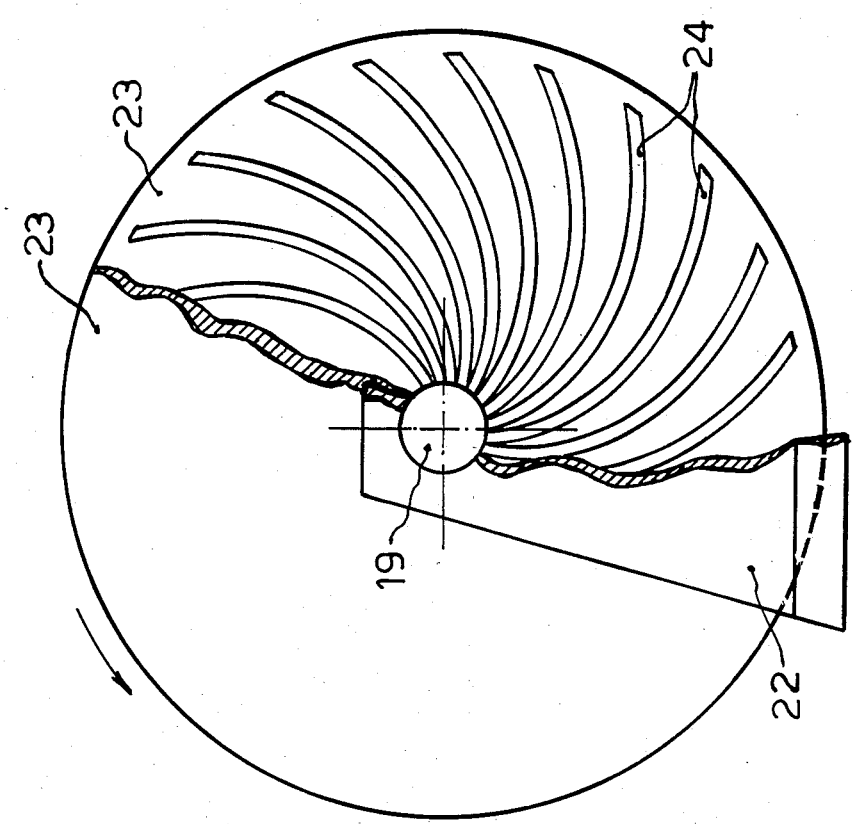
FIG. 2 is a partial side view of the traction wheel and one of its bearing supports.
Figure 1:
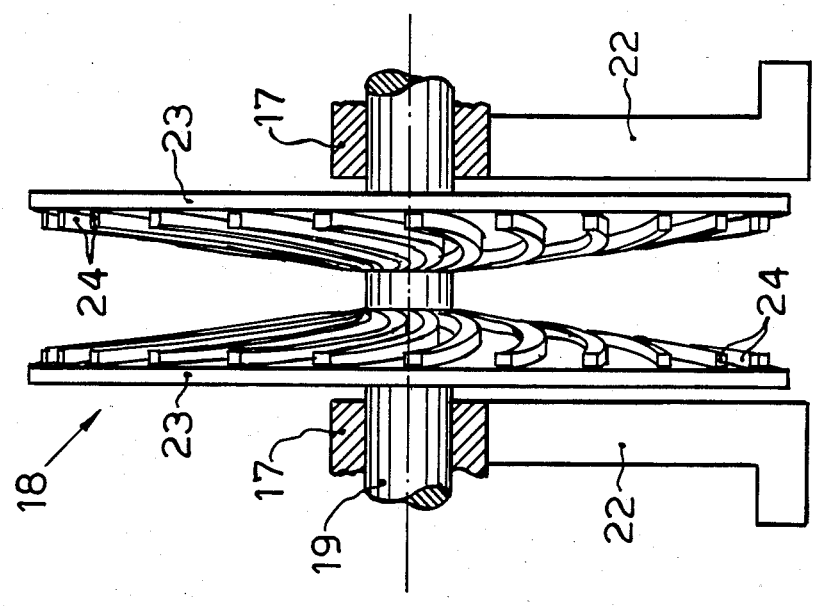
FIG. 1 is a simplified end view of part of a traction or drive wheel of the kind, known per se, to which the invention generally relates.

One embodiment of a traction wheel, which is known with respect to its general features, is diagrammatically illustrated in FIGS. 1 and 2, in which also a drive shaft 19 and a pair of bearings 17 supported by bearing supports 22 are shown.

The traction wheel 18 consists of two cam discs 23 which are rigidly connected with each other and with the shaft 19 and whose insides which face each other have the shape of a truncated circumferential surface. Each of these circumferential surfaces has a series of cams 24, which may be either integral with their respective cam disc or welded to the circumferential surface or united therewith in another way. As is apparent from FIGS. 1 and 2 the cams have a substantially rectangular (square) cross-section and are arcuately bent and so located on their respective cam discs, that the radially outermost end of each cam is located ahead of the inner end of the cam, as seen in the rotational direction of the traction wheel 18 as indicated by an arrow in FIG. 2. The inner ends of the cams are not directed radially but are preferably tangents to a circle having a radius which is a fraction of the radius of the cam disc.

Figure 3:
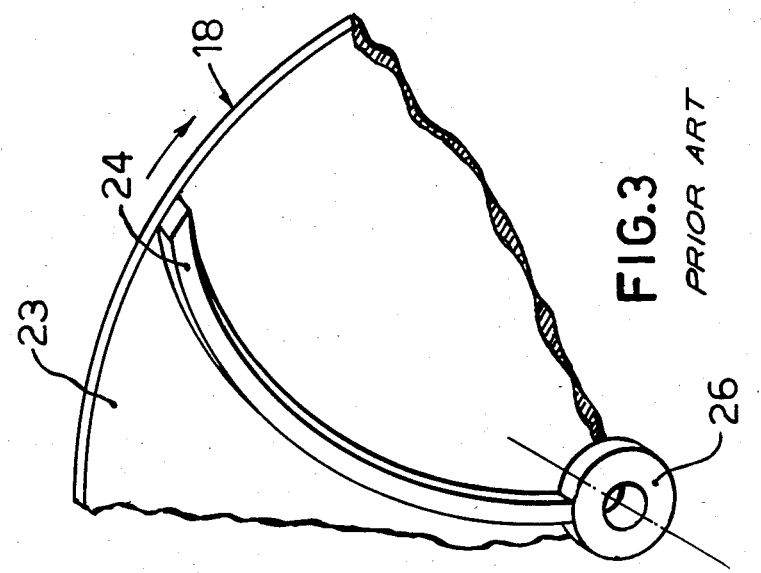
FIGS. 3 and 4 are partial plan views, which illustrate different profiles of the cams of the traction wheel.
Figure 4:
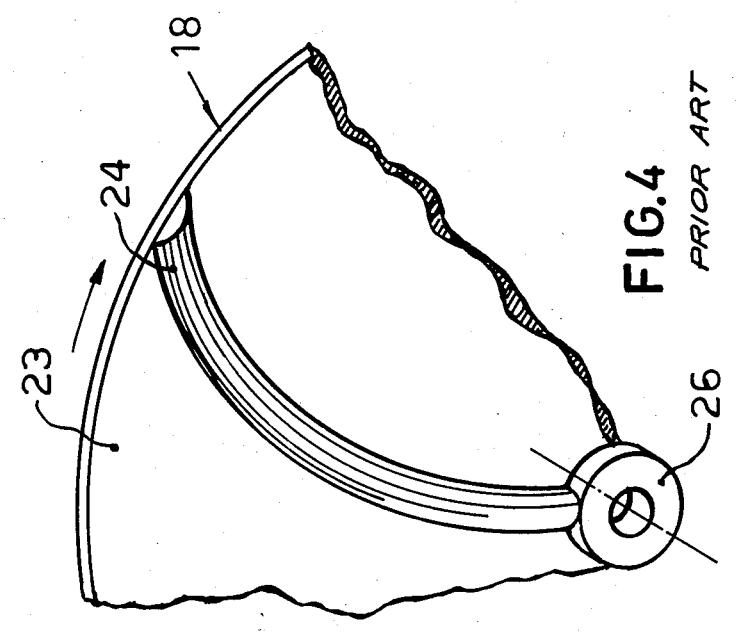

FIGS. 3 and 4 illustrate examples of other cam discs.

Thus, FIG. 3 illustrates part of a cam disc 23 having a central hub 26 and cams 24 which in this case have a rectangular cross-section with one of its longest sides facing inwards to the opposing cam disc 23. FIG. 4 is a view corresponding to FIG. 5 and illustrating a cam disc 18 having cams 24 with an arcuate cross-section.

The traction wheel described above which is basically known per se has been modified and further developed in several ways according to the invention to be able to be utilized in tools and equipments in many different technical fields. In so doing it is generally necessary to adapt the design of the cam discs and their mutual position or setting to the field of utilization, which entails different modifications of the embodiment described above, as is exemplified below. In most cases of application the traction wheel cooperates with a wire or rope or another "round-material". The cams 24 of the mutually opposing insides of the cam discs may be located either just opposite each other or may be displaced e.g. half of the pitch between two adjacent cams.

Particularly in such apparatus where the cross dimensions of the round-material may vary within relatively wide limits it may be suitable, according to one embodiment of the invention, to make the cam discs 23 of the traction wheel 18 mutually movable (displaceable) in the axial direction. Such an arrangement is illustrated in FIG. 5 which is a side view of a traction wheel 18, the two cam discs 23 of which are displacably and non-rotatably journalled on a shaft 76 having a number of slide ridges 77 which are in engagement with the hub of the traction wheel 18. On the ends of the shaft 76, which are threaded, two pairs of locking nuts 78 are provided. A compression spring 79, which is thread onto the shaft 76, is provided between the two cam discs 23 as well as between each disc and its adjacent pair of locking nuts 78. In dependence of the cross section of the round-material (not shown) fed in between the cam discs 23 these may be displaced away from each other without mutual rotation under compression of the springs 79. 23' designates the outer positions of the cam discs 23. Of course, it is within the scope of the invention to make only one of the cam discs 23 displaceable and the other cam disc stationary.

Figure 6:
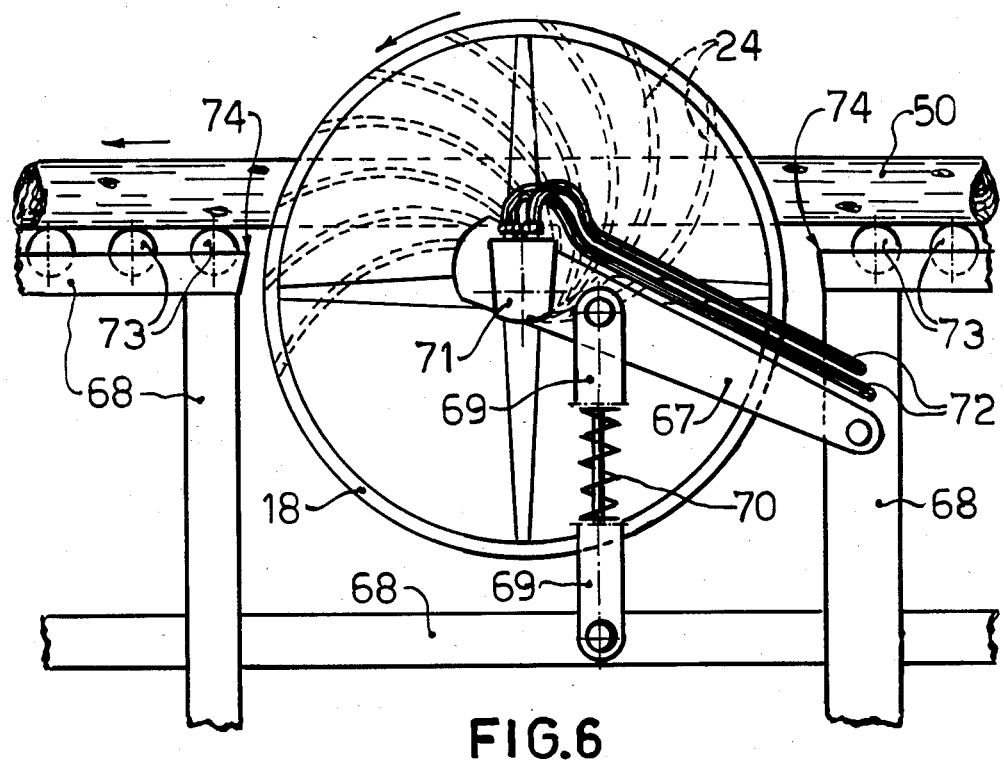
FIG. 6 illustrates in a plan view a timber feeder in which the traction wheel according to the invention can be utilized to advantage.

An area of application for the traction wheel according to FIG. 5 is a wood or timber transporter, the round-material being comprised of logs 50. According to FIG. 6 which is a simplified side view of a timber transporter, the traction wheel 18 is resiliently supported by a pair of bearing arms 67 which are pivotally connected to a framework 68 and supported by a pair of supports 69 which comprise spring elements 70 and are also pivotally connected to the framework 68. In the described embodiment the traction wheel 18 is powered by a hydraulic motor 71 which is connected to a pair of pressure fluid conduits 72. When the hydraulic motor 71 rotates the traction wheel 18 counter-clockwise, the log 50, which is supported by a pair of rollers 73 which are rotatably journalled in the framework 68, is advanced to the left according the arrows in FIG. 6. 74 designates the transit points between the transport table formed by the rollers 73 and the framework 68.

Figure 7:
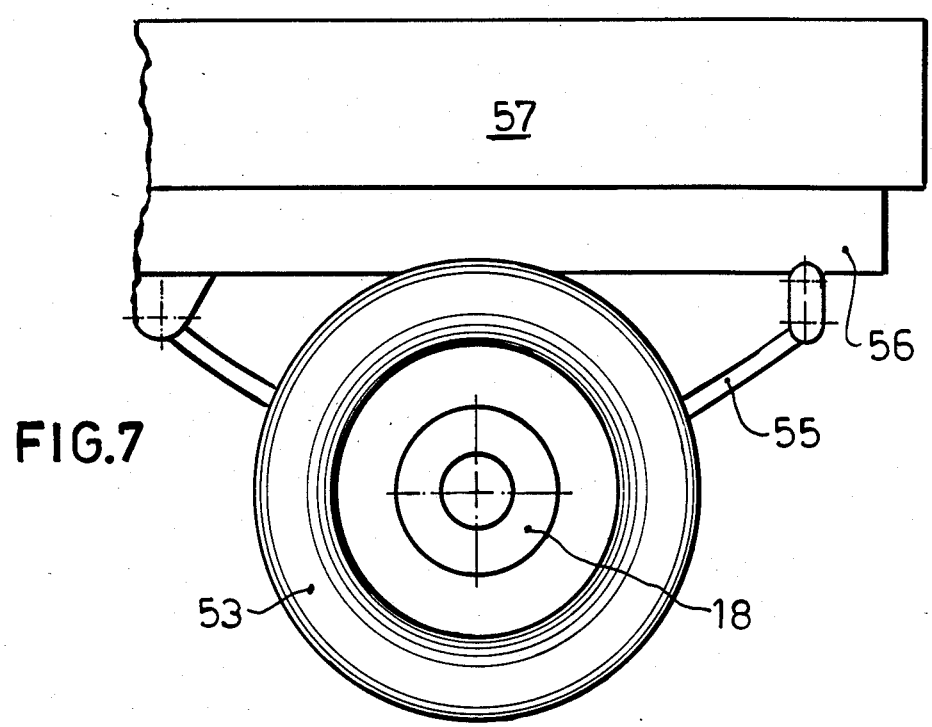
FIG. 7 is a diagrammatic side view of a traction wheel which is preferably constructed according to FIG. 5, coupled to a rear wheel of a truck.

The traction wheel may be driven in different ways. According to FIGS. 7 and 8 the traction wheel 18, which is preferably basically constructed according to FIG. 5 to be able to be adapted to wires or ropes of different thickness as round-material, is in a suitable manner, e.g. by means of bolts, secured to a truck wheel 53 and is accordingly driven by a truck or car motor. In FIGS. 7 and 8 there are designated by 54 a rear axle, by 55 a spring packet, by 56 a frame beam and by 57 a loading platform.

In the example of application according to FIGS. 7–8 it may be purposeful to make the cam discs mutually adjustable in the rotational direction instead of or as a supplement to their adjustability in the axial direction. Such adjustability in the rotational direction is illustrated in FIG. 9 which shows portions of a traction wheel having two cam discs 23a, 23b which have cams 24a and 24b, respectively, having a triangular cross-section, which are shown to be displaced half of the cam pitch mutually.

Figure 9:
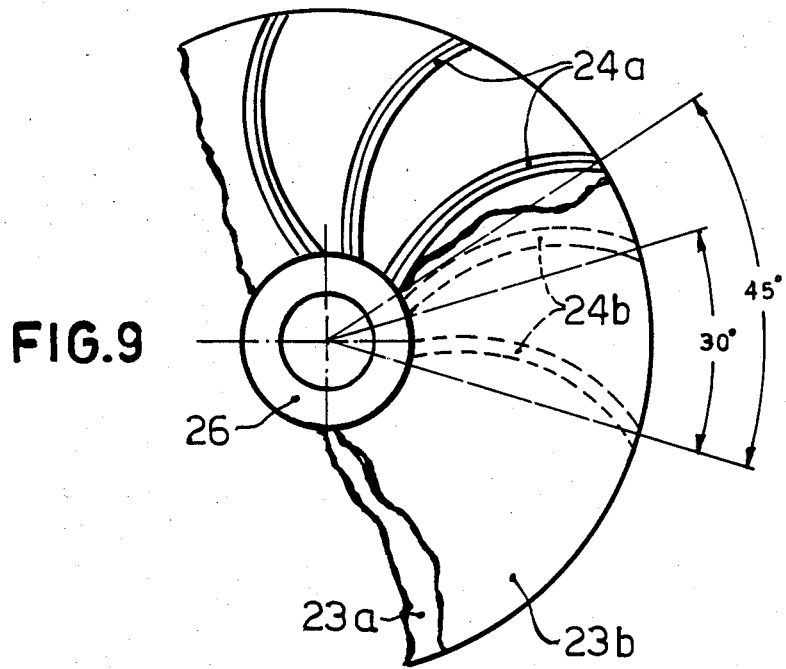
FIG. 9 is a partial plan view of a modified traction or drive wheel.
Figure 10:
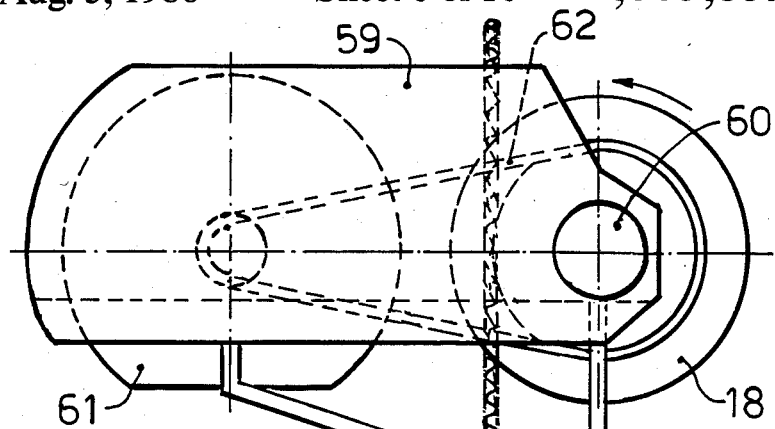
FIG. 10 is a side view of an electrically powered winch including the traction wheel according to FIG. 9.
Figure 11:
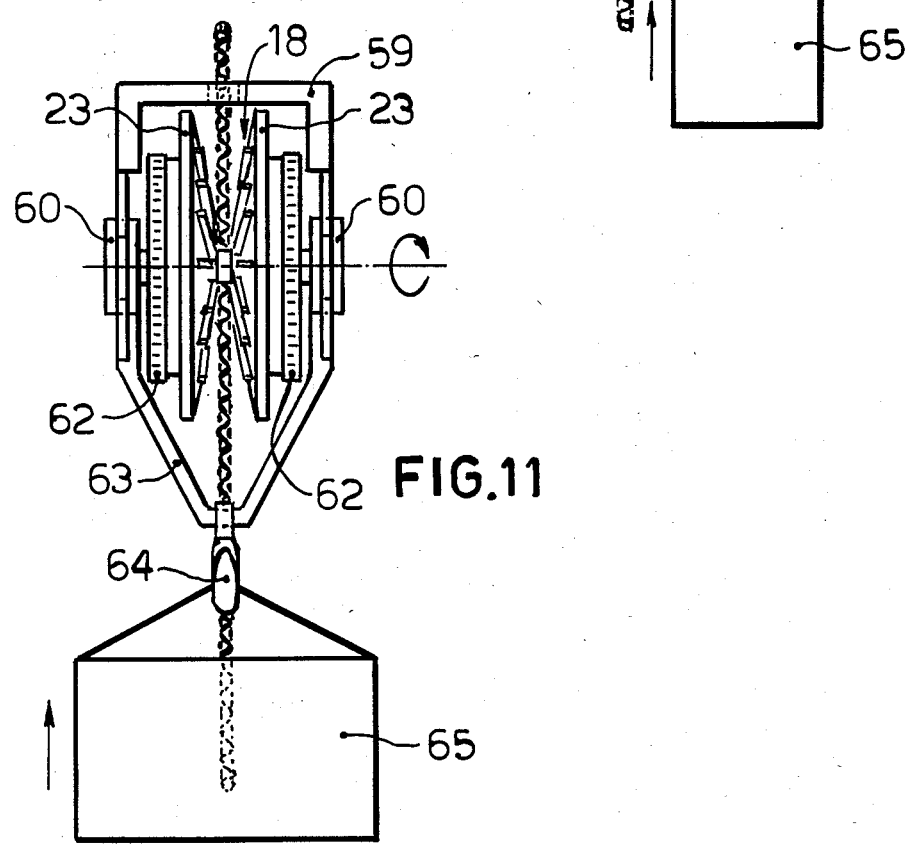
FIG. 11 is an end view corresponding to FIG. 10.

Traction wheels whose cam discs are adjustable in the rotational direction according to FIG. 9 are suitable e.g. in a lift or hoistening structure according to FIGS. 10 and 11, which are a side view and an end view, respectively. This device is intended to "climb" on some round-material 50, e.g. in the shape of a rope or a wire, and comprises a frame 59 which has bearings 68 for the traction wheel 18 and for an electric motor 61 which drives the traction wheel through a pair of tooth belts 62, a chain, a gear or the like. In the frame 59 there is displacably secured a holder 63 for a lifting hook 64 carrying a load 65 which is hoisted when the traction wheel 18 is rotated clockwise in FIG. 10, as is indicated by arrows in the Figures.

Figure 12:
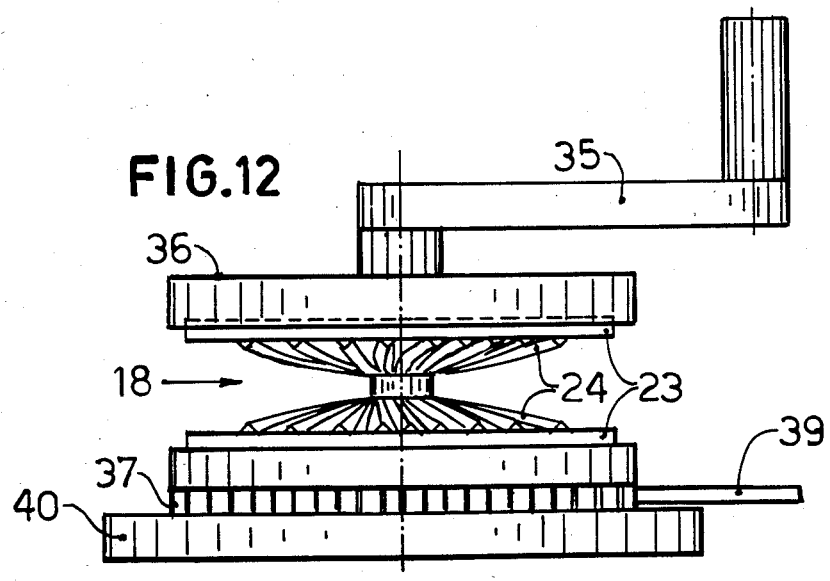
FIG. 12 is a diagrammatic side view of a manually powered ship winch which is primarily intended to be used on board sailing boats and comprises a traction wheel according to FIG. 9.
Figure 13:
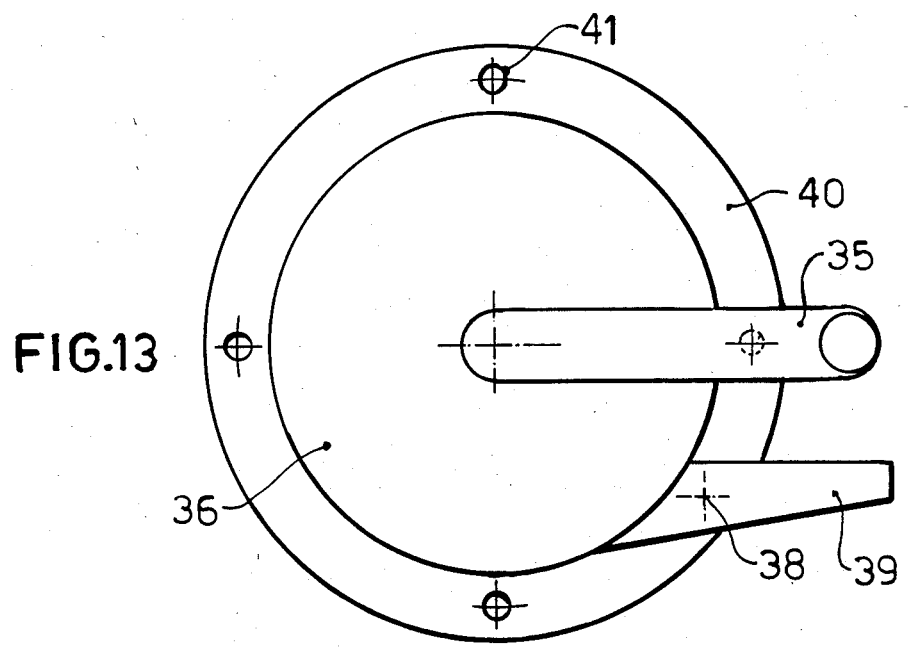
FIG. 13 is a plan view corresponding to FIG. 12.
Figure 15:
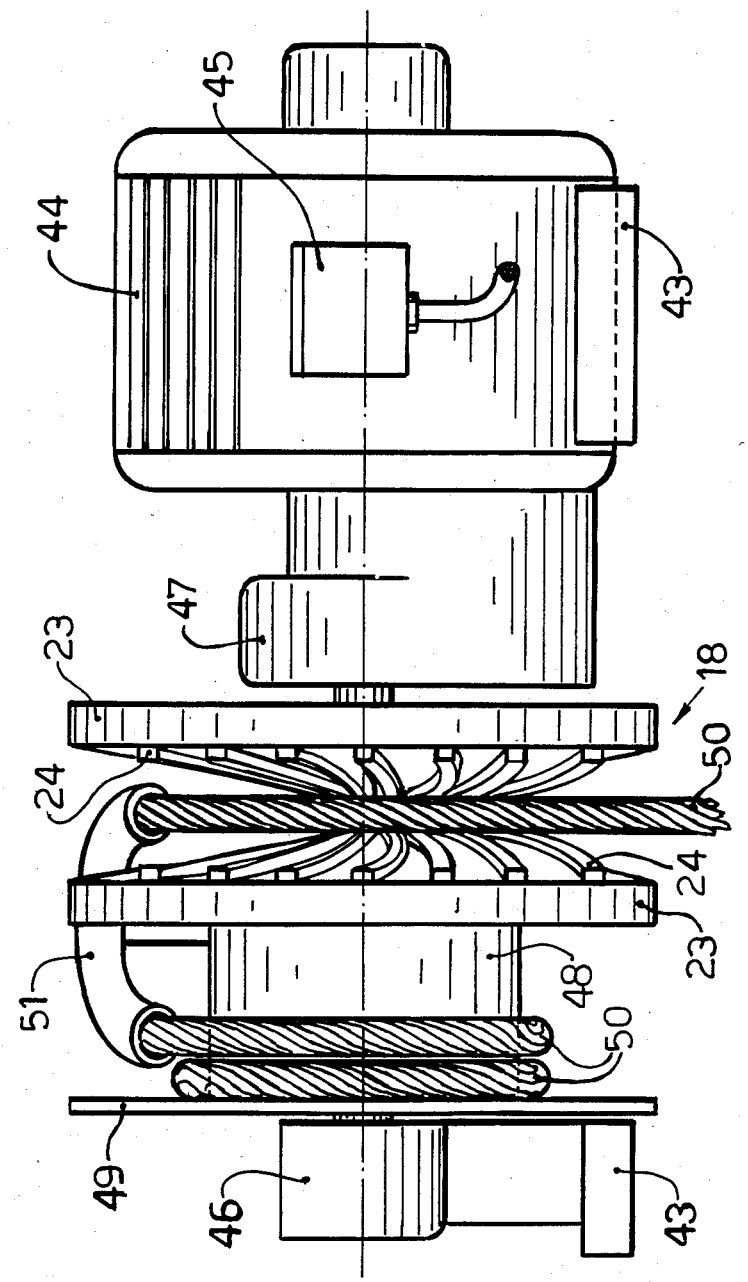
FIG. 15 is a simplified plan view of an electrically powered winch.

In FIGS. 12, 13 and 15 other fields of application of the device according to the invention are exemplified, particularly the pulling of ropes and the like. Thus, FIGS. 12 and 13 illustrate a manually powered winch in a side view and a plan view, respectively. The winch according to FIGS. 12–13, whose cam discs 23 are adjustable in the rotational direction with respect to each other in one embodiment, are primarily intended for sheets, halyards, ropes and other rigging on board sailing boats. It comprises a traction wheel 18 having cam discs 23 and cams 24 of the type described above and a crank 35 for rotating the traction wheel 18 manually. The traction wheel is covered by a protective housing 36. On the lower cam disc a toothed wheel ring 37 is secured coaxially, with which a ratchet 39 which is rotatable on an axis 38, cooperates. The entire winch which may be portable is rotatably supported by an attachment ring 40 which has four apertures 41 for studs or the like which are provided on a suitable, plane support surface on the ship.

As an alternative (or supplement) to the adjustment of the cam discs proper in the rotational direction with respect to each other it is also possible according to one embodiment of the invention to adjust the slant or slope of the individual cams, as seen in a plan view which is perpendicular to the rotational axis of the traction wheel. Stated in another way it is possible according to the invention to vary the angle between two radii which emerge from a common point on the axis of rotation and pass through the inner (rear) end and the fore end located farther from the axis of rotation of one and the same cam, respectively.

Figure 14:
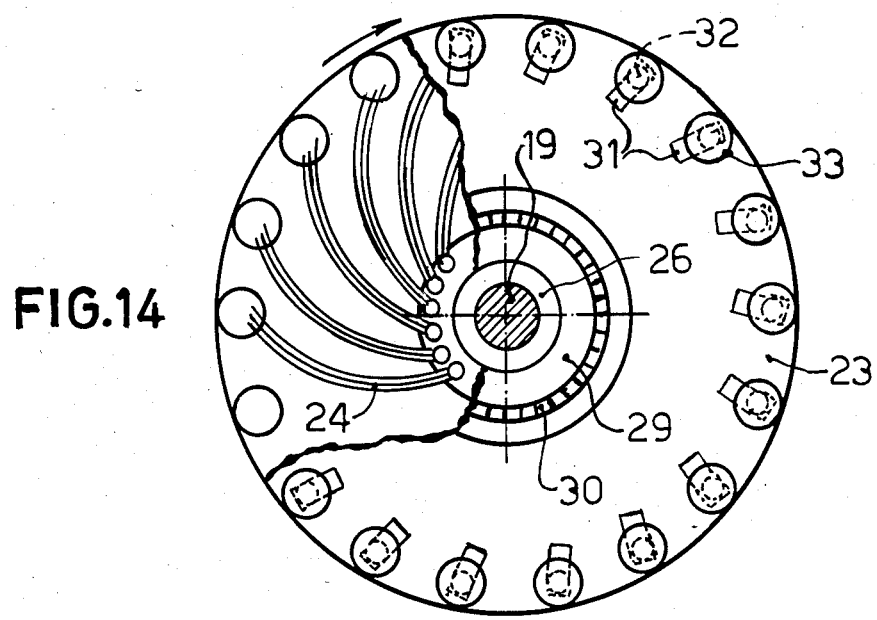
FIG. 14 is a partial plan view of a traction wheel having adjustable cams and its one cam disc partially broken away.

An embodiment in which such sloping or inclining is made possible is diagrammatically illustrated in FIG. 14. According to FIG. 14 the cam disc 23 comprises a hub ring 29 which is concentric with the remainder of the disc and is turnable with respect thereto, and locking heads 30 for fixation of the hub ring 29 in the adjusted angular or rotational position with respect to the cam disc. At its circumference the disc 23 has for each cam 24 a substantially radially directed slot 31, in which a stud 32 may slide which has an enlarged head 33 on the outside of the disc and in whose inner end, which is located between the two cam discs 23, the radially outer end of the respective cam is attached. The radially inner ends of the cams 24 are rotatably secured to the hub ring 29 in a corresponding way not represented in detail. It is obvious that it is possible to vary the angle between each arbitrary cam and a radius which intersects the cam in an arbitrary point by rotating and fixing the hub ring 29.

The embodiment according to FIG. 14 may be utilized instead of that according to FIG. 9, e.g. in winches according to FIGS. 12–13 and 15, which in a very simplified way illustrates an electrically powered, stationary winch, which is supported by two base plates 43, of which one is secured to the electric motor 44, whose electric connection is designated with 45. The other base plate carries a bearing housing 46. 47 is a gear through which the motor 44 drives the traction wheel 18. A take-up drum 48 provided with a guide ring 49 for fed-in round-material 50 in the shape of a wire, a string, a rope or the like is coupled to the traction wheel 18 through a friction clutch or the like (not shown). The rope or the like 50 is fed to/from the take-up drum 48 by means of a guide tube 51. The drum 48 with its guide ring 49 and guide tube 51 may possibly be omitted in certain cases.

Figure 16:
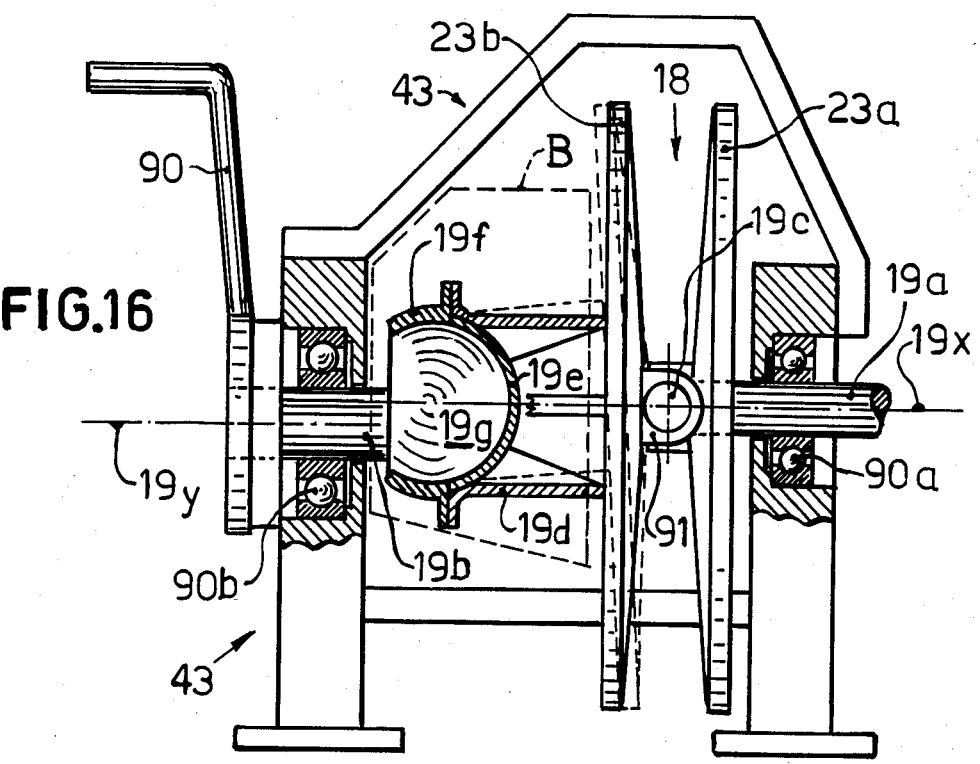
FIG. 16 is a simplified axial section through a winch or the like in which the rotational axes of the traction wheel form an angle with each other.
Figure 17:
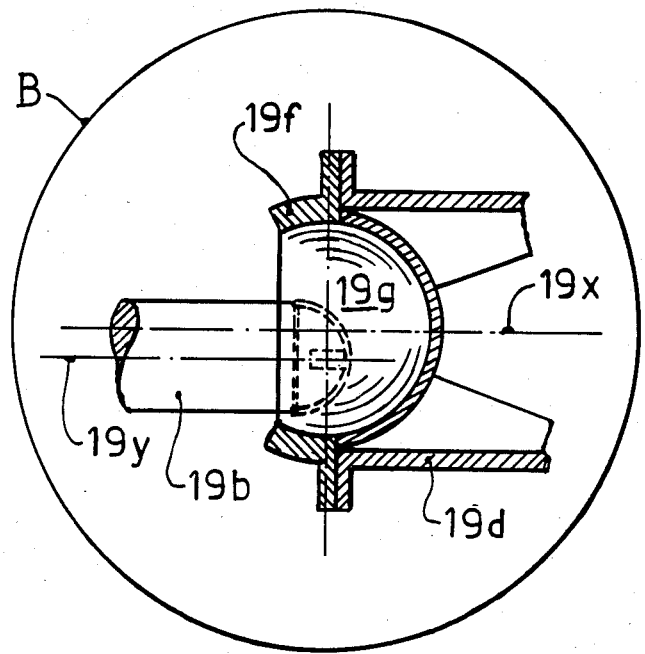
FIG. 17 illustrates the area B in FIG. 16 on a larger scale.
Figure 18:
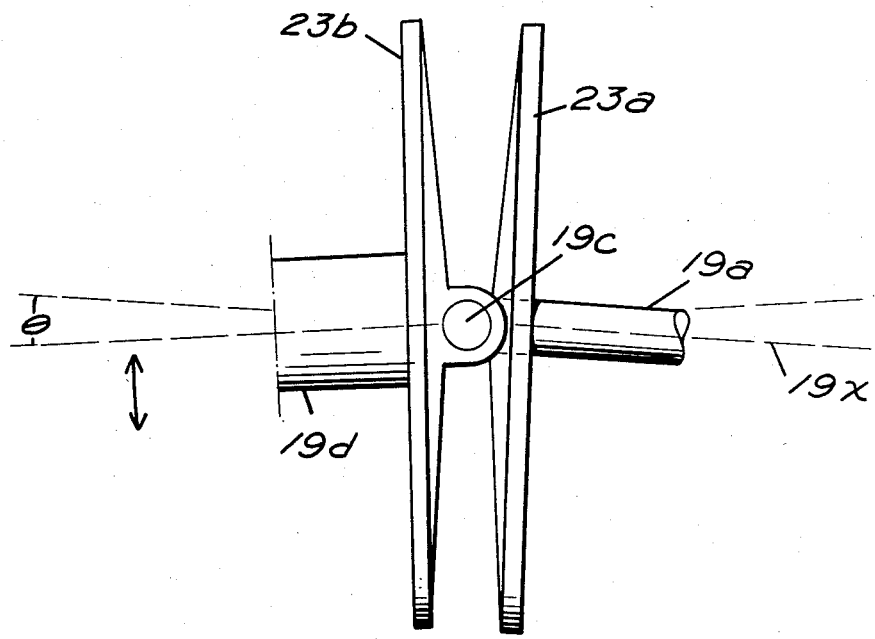
FIG. 18 is an elevated side view of the embodiment of the traction wheel shown in FIG. 16 wherein the axes of the two cam discs are displaced with respect to one another by an angle θ.

In a further embodiment of the invention, which may be applied e.g. to the winch according to FIGS. 12–13, the rotational axes of the two cam discs comprised in the traction wheel according to the invention may be inclined at an angle with respect to each other. Such an arrangement is exemplified in FIGS. 16–17 which diagrammatically illustrate the essential parts of a winch or the like having a framework 43 with two ball bearings 90a, 90b in which the traction wheel 18 is rotatably journalled, which comprises two cam discs 23a and 23b. By means of a driving input shaft 19a which is coupled to an arbitrary power source (not shown) and whose geometrical axis is designated with 19x, the cam disc 23a is rotatably journalled in the ball bearing 90a. By means of a universal joint 91 the cam disc 23b is nonrotatably (with respect to the shaft 19x) connected to the cam disc 23a in such a way that the cam disc 23b can tilt through a small angle θ around the axis 19c (as can most clearly be seen in FIG. 18).

The cam disc 23b is rigidly united with a tubular shaft 19d which in its turn is rigidly connected to a shell which forms part of a sphere and is comprised of two halves 19e and 19f and encompasses a solid angle which is greater than a hemisphere. The shell surrounds a body 19g which has the shape of part of a sphere and has an outer surface which corresponds to the inner surface of the shell 19e+19f (see also FIG. 17). The body and the shell are so interconnected that they can turn with respect to each other around the centre of the sphere. By means of a universal joint or the like the body 19g is universally rotatably connected to a shaft 19b which has the geometrical axis 19y and is journalled in the ball bearing 90 and to which a crank 90 or a hand wheel is non-rotatably connected. As is apparent from FIGS. 16 and 17 the axis 19y is parallel to and displaced with respect to the axis 19x (the eccentricity is exaggerated in FIG. 17). The arrangement described has as a consequence that the body 19g, which has the shape of part of a sphere, and the shell 19e+19f, which also has the shape of part of a sphere, carries out a planetarily circulating movement on the axis 19y when the crank 90 or the corresponding hand wheel is rotated.

Through the arrangement described above the rotational axis of the cam disc 23b will constitute a generatrix of a cone having a predetermined apex angle and whose apex is located in the intersection between the axes 19c and 19x. This generatrix may be rotated around the centre axis of the cone by rotating the crank 90. Through simple, mechanical means it is also possible to parallel-displace the axis 19y as well as to turn it around with the axis 19x as its axis of rotation.

In a special case of this embodiment the angle between the axes of rotation 19a and 19d is fixed, set once and for all.

The embodiments described above and illustrated in the drawings are, of course, to be regarded merely as nonlimiting examples and may as to their details be modified in several ways within the scope of the following claims. In particular new embodiments, which are also comprised by the invention, may be created by combining details taken from different ones of the exemplary embodiments described above.

We claim:

1. An apparatus for longitudinally displacing elongated objects, comprising:
   means for defining a first axis of rotation;
   means for defining a second axis of rotation, said second axis of rotation intersecting said first axis of rotation at an angle, said first axis of rotation comprising a generatrix of a cone of revolution, said cone having a vertex at said intersection of said first and second axes, the top (apex) angle of said cone being equal to said angle between said first and second axes;
   a first disc rotatable about said first axis of rotation, said first disc including means for defining a first surface;
   a second disc rotatable about said second axis of rotation, said second disc including means of defining a second surface substantially opposing said first surface of said first; and
   means for rotating said generatrix about the axis of revolution of said cone.

2. An apparatus for longitudinally displacing elongated objects, comprising:
   a first shaft rotatable about a first axis of rotation;
   a second shaft having a second axis of rotation, said second axis of rotation intersecting said first axis of rotation at an angle, said second axis of rotation comprising a generatrix of a cone of revolution, said cone having a vertex at said intersection of said first and second axis, the top (apex) angle of said cone being equal to said angle between said first and second axes;
   a first disc secured to said first shaft, said first disc having a first, substantially conical surface;
   a second disc rotatable about said second axis of rotation, said second disc having a second substantially conical surface substantially opposing said first substantially conical surface of said first disc, said first and second substantially conical surfaces defining therebetween an interspace having a substantially V-shaped cross section and extending substantially circumferentially around said discs;

means for rotating said first and second discs together; and means for rotating said second axis of rotation around the axis of revolution of said cone.

3. An apparatus as in claim 2 wherein said angle is predetermined and constant.

4. An apparatus as in claim 2 further including means for varying said angle.

5. An apparatus as in claim 2 wherein said second disc is non-rotatably secured to and rotatable together with said second shaft.

6. An apparatus as in claim 5 wherein said means for rotating said first and second discs together comprises an articulated joint.

7. An apparatus as in claim 2 further including means for defining on said first surface a first plurality of ridges extending substantially radially outward from said first shaft.

8. An apparatus as in claim 7, wherein the ridges of said first surface have a substantially arcuate contour.

9. An apparatus as in claim 2 further including means for defining on said second surface a second plurality of ridges extending substantially radially outward from said second shaft.

10. An apparatus as in claim 9, wherein the ridges of said second surface having a substantially arcuate contour.

11. An apparatus as in claim 2 wherein:

the width of said interspace varies with position on the circumference of said first and second discs; and said second axis rotating means selectively positions the widest portion of said interspace anywhere on a circle having its center located on one of said first and second axes of rotation and lying in a plane which is normal to said one axis.

12. An apparatus for longitudinally displacing objects, comprising:

a first shaft rotatable about a first axis of rotation;

a first disc non-rotatably connected to said first shaft, said first disc including means for defining a first surface;

a second shaft rotatable about a second axis of rotation;

a second disc non-rotatably connected to said second shaft, said second disc including means for defining a second surface opposing said first surface of said first disc;

first coupling means for coupling said first and second discs together to cause mutual rotation thereof, said first coupling means permitting angular displacement of said second axis of rotation with respect to said first axis of rotation;

means for rotating said first shaft about said first axis of rotation;

a third rotatable shaft; and second coupling means for coupling said third shaft to said second shaft, said second coupling means including means for rotating said second axis of rotation about an axis intersecting said first axis of rotation at an angle in response to rotation of said third shaft, said second coupling means including means for permitting said second shaft to rotate independently of the rotation of said third shaft.

13. An apparatus as in claim 12 wherein said second coupling means comprises:

a first body rigidly connected to said second shaft, said first body including means for defining a substantially spherical cavity therein; and a substantially spherical second body rotatably disposed within said cavity, said second body including means for connecting with said third shaft, said connecting means parallelly displacing the axis of rotation of said third shaft from said second axis of rotation.

14. An apparatus as in claim 13 further including means for changing the parallel displacement of said axis of rotation of said third shaft from said second axis of rotation.

15. An apparatus as in claim 13 further including means for selectively rotating said third shaft.

16. An apparatus as in claim 12 wherein said second coupling means includes means for parallelly displacing the axis of rotation of said third shaft from said second axis of rotation.

* * * * *